United States Patent [19]

Grisley

[11] Patent Number: 5,156,508
[45] Date of Patent: Oct. 20, 1992

[54] CAM ACTION CLAMP

[76] Inventor: Kenneth M. Grisley, P.O. Box 4646, Quesnel, B.C., Canada, V2J 3J8

[21] Appl. No.: 639,499

[22] Filed: Jan. 9, 1991

Related U.S. Application Data

[63] Continuation-in-part of Ser. No. 457,415, Dec. 27, 1989, abandoned.

[51] Int. Cl.$^5$ ............................................. F16B 19/00
[52] U.S. Cl. .................................... 411/354; 411/429; 411/432; 411/916; 269/236
[58] Field of Search .............. 411/354, 355, 429, 432, 411/916, 935, 935.1; 269/230, 236

[56] References Cited

U.S. PATENT DOCUMENTS

| | | | |
|---|---|---|---|
| 1,262,743 | 4/1918 | Bronson | 411/429 |
| 1,432,121 | 10/1922 | Prickett | 269/236 |
| 3,424,450 | 1/1969 | Atkins | 269/236 |
| 3,709,088 | 1/1973 | Pitzer | 411/354 |
| 4,805,505 | 2/1989 | Cantlin | 269/236 |

FOREIGN PATENT DOCUMENTS 799 of 1895 United Kingdom ................ 269/236

Primary Examiner—Neill R. Wilson
Attorney, Agent, or Firm—Townsend and Townsend

[57] ABSTRACT

A cam action clamp for use against a fixed clamping surface comprising a threaded shaft extending outwardly from the fixed clamping surface and a movable clamping member having a channel therethrough to allow the clamping member to be mounted on the threaded shaft for slidable movement along the shaft. A thrust plate is affixed to the movable clamping member adjacent the channel. A mounting block is threadably mounted on the threaded shaft and a clamping handle is pivotally mounted to the mounting block. The handle is formed as a cam member that abuts the thrust plate. Pivoting the handle causes the cam member to engage the thrust plate to slidably advance the movable clamping member along the threaded shaft toward the fixed clamping surface in order to clamp an article between the surfaces. The mounting block can be rotated along the threaded shaft to vary the distance between the clamping surfaces. The thrust plate can be formed with stepped surfaces that allow the clamping handle to be repositioned to a more convenient angle while still applying the same clamping force. In addition, a shroud member is provided that encloses the threaded shaft to prevent objects, such as a user's hand, getting pinched between the shaft and the pivotable clamping handle.

14 Claims, 3 Drawing Sheets

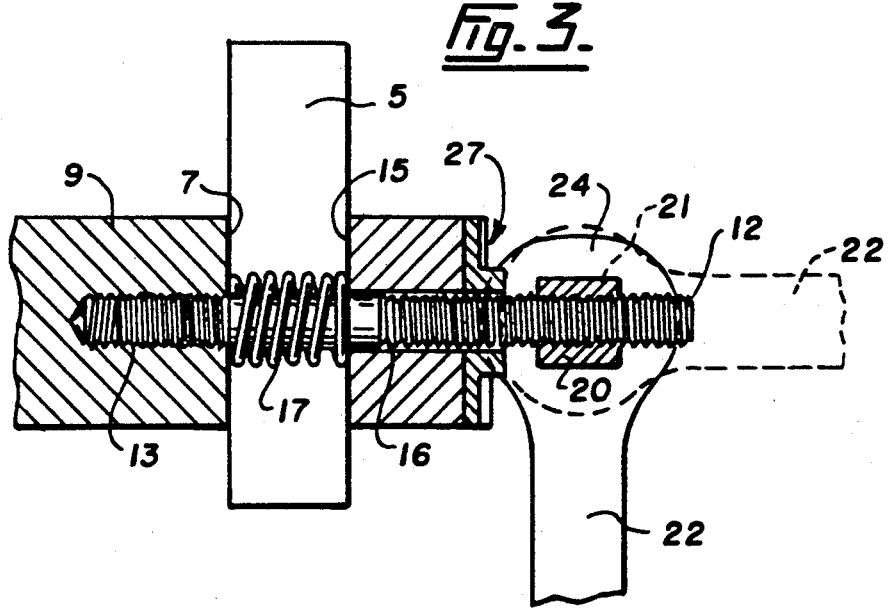
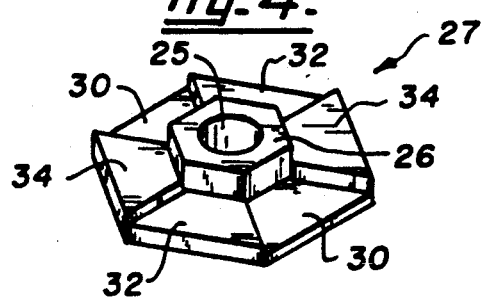

CAM ACTION CLAMP

REFERENCE TO RELATED APPLICATIONS

This application is a continuation-in-part of U.S. patent application No. 457,415 filed Dec. 27, 1989, now abandoned the disclosure of which is incorporated herein by reference.

FIELD OF THE INVENTION

This invention relates to a clamping device.

BACKGROUND OF THE INVENTION

Clamping devices for holding materials to be worked upon are well known, particularly in the woodworking industry where a workpiece is held on a jig. Clamps that use a cam-shaped surface to engage and position a clamping surface are particularly preferred as they allow for quick clamping of a workpiece with a single motion.

Prior art examples of such cammed clamping devices are shown in the following U.S. Patents:

U.S. Pat. No. 2,908,303 to Schmidt, Jr. teaches a clamping device that uses a locking handle to rotate spaced cam portions.

U.S. Pat. No. 2,402,165 to Clutter discloses a work clamp that has a pivoting clamping lever having distal cam portions that are used to tighten and release the clamp.

U.S. Pat. No. 423,992 to Froelich discloses a conventional screw clamp having a cam lever to tightly clamping the material as a final adjustment.

U.S. Pat. No. 2,639,744 to Herbert teaches an adjustable cam actuated clamp.

U.S. Pat. No. 2,043,125 to Stahl provides a cammed clamping device that can be adjusted by virtue of manually rotatable nut atop the threaded shaft on which the clamping member of the device moves.

The chief disadvantage present in existing cam action clamp designs as exemplified by the above prior art is that no easy means are provided to adjust the clamp during the process of actually clamping a workpiece. It is an inevitable result of using cammed clamping devices that adjustments must be made in the distance between the gripping surfaces of the clamp in order to accommodate workpieces of different sizes. A clamp controlled by cammed actuating means exerts a maximum clamping force at a definite point in the rotation of the cam, and the cam is only able to move the clamping surfaces together by a specified distance determined by the size of the cam lobes. Therefore, clamps that use a camming action must be adjustable on a coarse scale independent of the camming action to handle different sized workpieces whereupon the cammed clamping action can be used as a fine scale adjustment to obtain the desired clamping force.

Generally, the prior art devices rely on fairly complex coarse adjustment means that make operation of the clamp when setting up for a new size of workpiece awkward. For example, Stahl's clamping device has a coarse adjustment means comprising a knurled knob atop a threaded shaft. The design is such that when the cam action clamp is used adjustment of the knurled knob is prevented so that adjusting the clamp for a new workpiece becomes a trial and error process of adjusting the knurled knob, testing the cammed clamping action for adequate grip, then releasing the cammed clamp and making further adjustments to the coarse adjustment through the knurled knob. Admittedly, a skilled worker would probably be able to accomplish this task in one or two trials, but a less frequent user would likely require more trials resulting in wasted time and effort each time a workpiece is changed.

SUMMARY OF THE INVENTION

Accordingly, there exists a need for a cam action clamp that is simple to operate and provides combined coarse and fine adjustments means that allows for quick and efficient adjustment.

The present invention is a cam action clamp comprising:

a threaded shaft extending outwardly from a fixed clamping surface;

a movable clamping member having a clamping surface and a channel therethrough to allow said member to be mounted on said threaded shaft for slidable movement along said shaft;

a thrust plate adjacent said movable clamping member adjacent said channel;

coarse adjustment means comprising a mounting block threadably mounted on said threaded shaft;

a clamping handle pivotally mounted to said mounting block, said handle being formed with fine adjustment means comprising a cam member that abuts said thrust plate whereby pivoting said handle causes said cam member to engage said thrust plate to slidably advance said movable clamping member along said threaded shaft toward said fixed clamping surface in order to clamp an article between said clamping surfaces, and whereby said mounting block can be rotated along said threaded shaft to vary the distance between said clamping surfaces;

said thrust plate being formed with means to permit substantially the same clamping force to be exerted at different clamped positions of the clamping handle with respect to said threaded shaft.

Various embodiments of the present invention are provided. In one embodiment, a cam member is provided that engages the thrust plate and tightens the clamp when the handle is pivoted to a position that is essentially parallel to the threaded shaft. In this arrangement, when not being used to clamp a workpiece, the clamping handle lies in a plane parallel to the movable clamping surface to provide an easily accessible lever to rotate the mounting block for movement along the threaded shaft to provide coarse adjustment of the movable clamping surface with respect to the fixed clamping surface.

Another embodiment is formed with a cam member that tightens the clamp when the handle is pivoted to a position that is essentially perpendicular to the threaded shaft. This embodiment has a clamping handle that extends outwardly perpendicular to the movable clamping surface when the clamp is not being used to hold a workpiece. The outwardly extending handle can be rotated in a similar manner to a torque knob commonly found on existing clamps.

In a still further embodiment, the cam action clamp of the present invention can be provided with a shroud member enclosing the threaded shaft and adapted to permit pivoting of the handle member past the shaft and to prevent objects from becoming caught between the handle and threaded shaft during the pivoting movement.

BRIEF DESCRIPTION OF THE DRAWINGS

The various embodiments of the present invention are shown in the accompanying drawings in which:

FIG. 3 is a pictorial view showing a second embodiment of the clamp;

FIG. 4 is a detail view of the means to align the clamping handles;

DESCRIPTION OF THE PREFERRED EMBODIMENTS

Figure 1:
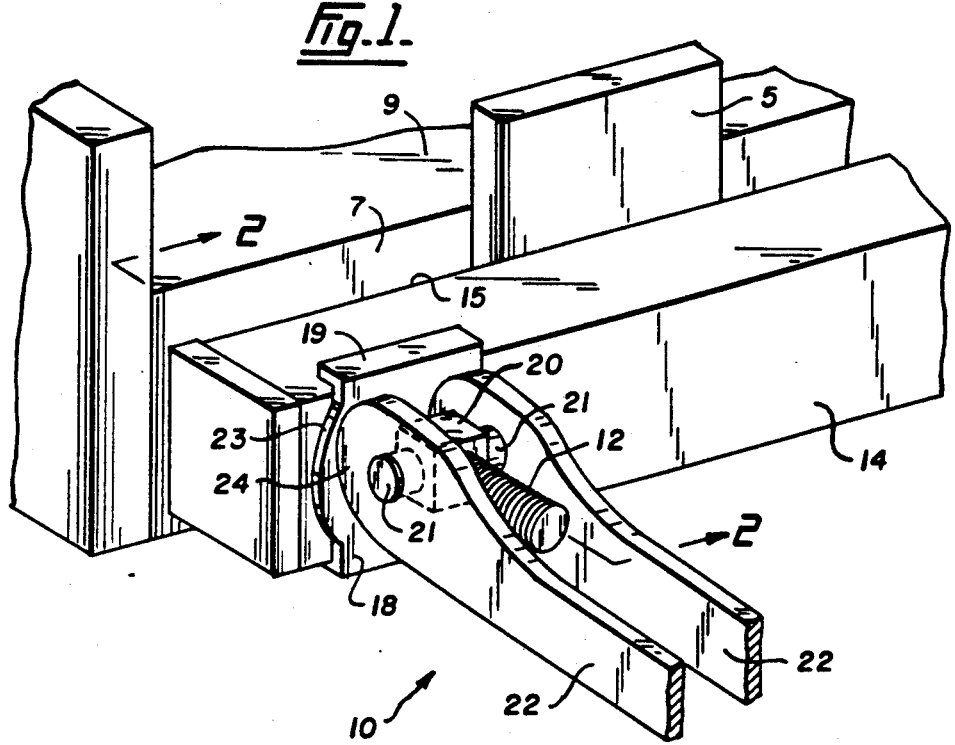
FIG. 1 is a pictorial view showing a first embodiment of the clamp in use.
Figure 2:
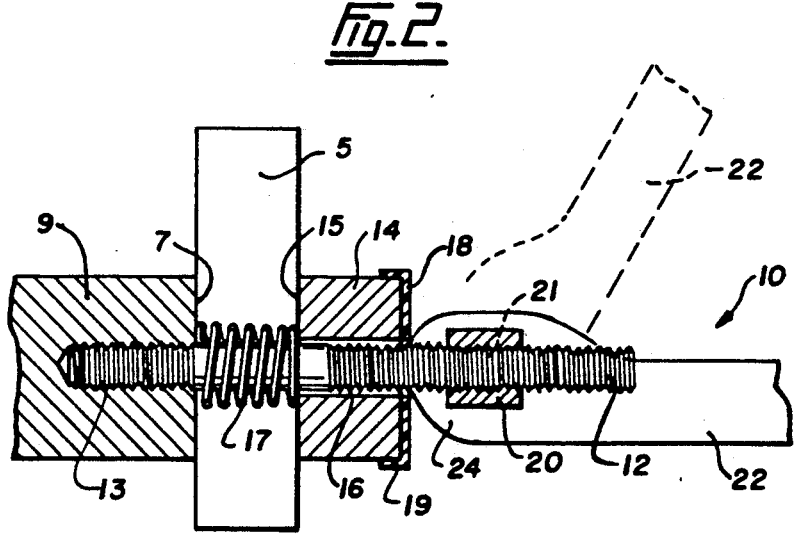
FIG. 2 is a section view taken along line 2—2 of FIG. 1.

A cam action clamp 10 according to a first embodiment of the present invention is shown in FIGS. 1 and 2 in use clamping a workpiece 5 against a fixed clamping surface 7 of a conventional clamping jig 9.

As best shown in the sectional view of FIG. 2, cam action clamp 10 comprises a threaded shaft 12 that extends outwardly from fixed clamping surface 7. Shaft 12 is threadably mounted in the fixed clamping surface using drilled hole 13. A movable clamping member 14 or bar has a channel 16 drilled therethrough to allow the movable clamping bar to be mounted on the threaded shaft for slidable movement along the shaft. Clamping bar 14 has a clamping surface 15 that engages the workpiece. Preferably, spring 17 is located on shaft 12 between the fixed clamping surface 7 and movable clamping member 14 in order to urge the movable clamping bar against the clamping handle of the clamp.

There is a thrust plate comprising a washer 18 affixed to the movable clamping member adjacent channel 16. Washer 18 is formed with a central passage to accommodate the threaded shaft. Washer 18 can be formed with gripping extensions 19 that overlap the edges of the movable clamping bar to positively locate the washer on the movable clamping member. Alternatively, washer 18 can be free to rotate about shaft 12 for even wear of the washer. Preferably, the washer is formed from a suitable material that is able to withstand the wear to which the washer is subjected.

Threadably mounted on shaft 12 is coarse adjustment means comprising a mounting block 20 having outwardly extending trunnion arms 21 on opposite sides of the block. Pivotally attached to these trunnion arms are a pair of parallel longitudinal members 22 that together form a handle by which the cam action clamp is operated. In the illustrated first embodiment, the handle is formed from two members, however, it is readily apparent that the handle could also be formed from a single member formed into a Y shaped extension at one end, each arm of the Y being fitted over a trunnion arm.

The ends of longitudinal members 22 are formed into fine clamping adjustment means comprising a cam member consisting of a pair of cam lobes 24 that are rotatable about trunnion arms 21 to abut and engage thrust plate washer 18.

The cam action clamp as shown in FIGS. 1 and 2 is in a gripping position with cam lobes 24 abutting thrust plate washer 18 to urge movable clamping member 14 along shaft 12 toward fixed clamping surface 7 thereby clamping workpiece 5 between the two surfaces 7 and 15. Note that when in a gripping position, the handle of the cam action clamp extends essentially parallel to threaded shaft 12 and perpendicular to the clamping surfaces.

To release the cam action clamp, the handle is pivoted to a position that is parallel to the plane of the clamping surfaces as shown by dashed lines in FIG. 2. In such a parallel alignment, the handle can be used as a lever to rotate mounting block 20 along shaft 12 to provide for coarse adjustment of the movable clamping member so that workpieces having dimensions that range widely can be used in the clamp of the present invention. Note that thrust plate washer 18 as illustrated is provided with a circular front face 23 to accommodate cam lobes 24 at whatever position they may engage the washer surface after the handle is rotated about shaft 12 for coarse adjustment. Once coarse adjustment of the clamp has been accomplished, the handle can be rotated toward a position essentially parallel to the threaded shaft to provide fine adjustment of the clamping grip through the action of cam lobes 24. Therefore, the cam action clamp of the present invention provides a quick acting and simple clamping motion that requires only a single hand to manipulate the clamp handle.

FIGS. 3 and 4 show a second embodiment of the present invention in which parts identical to the first embodiment are similarly numbered. The second embodiment uses paired cam lobes 24 formed on opposite edges of each longitudinal member 22. These cam lobes are adapted to engage a thrust plate 18 when the clamping handle is in a position essentially perpendicular to threaded shaft 12. In this arrangement, the pair of identical cam lobes 24 at the end of each longitudinal member allow the clamping handle to be pivoted to either one of two positions, 180 degrees apart from each other, whenever the clamp is tightened. When the clamp of the second embodiment is not holding a workpiece, the clamping handle extends essentially parallel to the threaded shaft. In such a position, the handle can be used as a torque knob for coarse adjustment of the clamping surfaces. The handle can also be used as a torque lever when perpendicular to the threaded shaft for additional adjustment.

A choice of two clamping positions for the clamping handle of the second embodiment allows the user to position the clamping handle so as to minimize interference with the workpiece held in the clamp. In some situations, however, it is impossible to have the clamp sufficiently tight and the clamping handle out of the way. The second embodiment of the present invention is preferably provided with a modified thrust plate 27 that is formed with means to permit substantially the same clamping force to be exerted at different clamped positions of the clamping handle. This allows for rotation of the clamping handle to a clamping position that does not interfere with the workpiece.

FIG. 4 shows a detailed view of such a modified thrust plate. The thrust plate has a central aperture 25 through which threaded shaft 12 passes. A raised section 26 having multiple sides surrounds and defines central aperture. In the illustrated thrust plate, the raised section is hexagonal, but other configurations are possible. About the raised section, the surface of the thrust washer that faces the cam lobes is formed into a series of stepped surfaces that correspond with the sides of the raised section. The opposite face of the thrust plate abuts the movable clamping bar 14.

The stepped surfaces exist in pairs at opposite ends of a diameter of the thrust washer. Each stepped surface is separated from an adjacent surface by a small vertical distance. Preferably, each stepped surface is separated from an adjacent surface by a distance that is some multiple of the pitch of the threaded shaft divided by the number of pairs of stepped surfaces. For example, in the illustrated embodiment, the pair of surfaces 30 represent a reference level. Surfaces 32 and 34 are further pairs of stepped surfaces that are above the reference level surfaces 30. As there are three pairs of stepped surfaces formed in the thrust plate surface, the vertical distance separating surface 30 from surface 32 and surface 32 from surface 34 is one third the thread pitch of the threaded stud 12. Of course, surface 34 is spaced two thirds of the thread pitch of the threaded stud above surface 30.

Thrust plate 27 with its various stepped surfaces is used in the following manner. Normally, the thrust plate rotates with the clamping handle by virtue of raised section 26 being inserted between cam lobes 24 and rotating with the lobes. The cam lobes engage against a pair of sides of the raised section adjacent reference surface 30. If, when the clamp is tightened, the optimum clamping position results in the clamping handle being in the way or in an awkward position, the clamping handle is released and the thrust plate is disengaged from between the cam lobes so that the plate can be rotated independently of the clamping handle about threaded shaft 12. Clamping handle is then backed off along the threaded shaft a fraction of a turn so that the handle will no longer interfere with the workpiece when the clamp is tightened. Rotating the clamping handle also affects the coarse adjustment as mounting block 20 is also rotated and backed off. To offset the change in the coarse adjustment, the thrust plate is rotated through an angle to align the paired stepped surfaces that correspond to the fraction of a turn given to the clamping handle with the cam lobes of the clamping handle. The thrust plate is then re-engaged between the cam lobes 24. In this way, when the clamping handle is pivoted to its new clamping position it will exert the same optimum clamping force on the workpiece as the cam lobes are still effectively positioned at the same location along the threaded shaft with respect to the movable clamping bar 14 by virtue of the stepped surfaces now positioned beneath the cam lobes taking up any distance that was given up when backing off the clamping handle.

By way of example, consider the thrust plate of FIG. 4. Paired surfaces 30 represent a reference surface. Paired surfaces 32 represent a surface that is raised one third of the threaded shaft pitch above the reference surface. Therefore, if the clamping handle is rotated through one third of a revolution or 120 degrees to place the handle in a more convenient position, the cam lobes will be backed off from the optimum clamping position a distance equal to one third of the pitch of the threaded shaft. The thrust plate is rotated such that surfaces 32 are aligned beneath the cam lobes to make up for the distance lost in backing off the clamping handle. In a similar manner, surfaces 34 are positioned beneath the cam lobes when the clamping handle is rotated through two thirds of a revolution or 240 degrees.

Alternatively, the thrust washer can simply be rotated to bring a different pair of stepped surfaces beneath the cam lobes and then re-engaged between the cam lobes without rotating the clamping handle initially. The user can then back off the clamping handle as he desires.

The thrust plate washer of FIG. 4 in combination with a double cam arrangement allows for six handle positions for any optimum gripping position. Three different angles of the handle are possible with the thrust plate shown and the double cam arrangement allows for a 180 degree switch with each of the angles for a total of six positions.

It is contemplated that the various surfaces of the thrust plate can be marked with appropriate reference symbols such as "0", "+⅓" and "+⅔" to indicate the reference level and which surfaces should be aligned beneath the cam lobes when a one third or two thirds revolution of the clamping handle is made.

In addition, it will also be understood that more or less paired stepped surfaces can be formed in the thrust washer to allow for more or less adjustment in the clamping position of the clamping handles.

Figure 5:
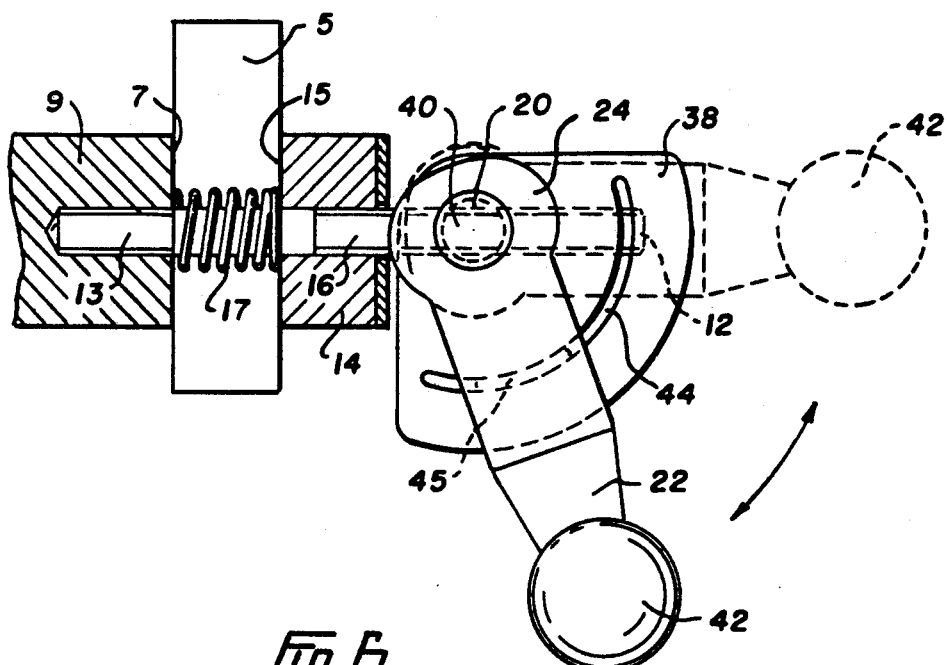
FIG. 5 is a side elevation, partly in section, of a further embodiment.
Figure 6:
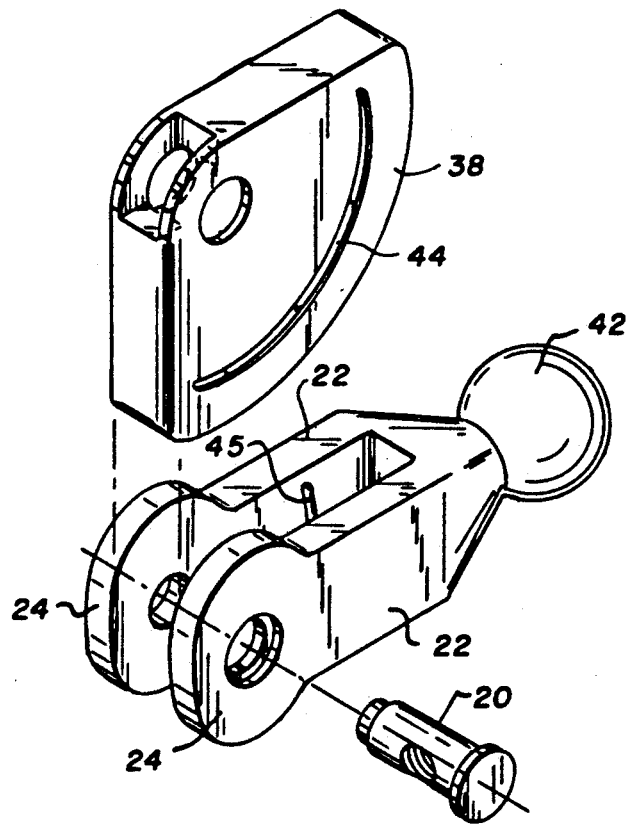
FIG. 6 is an exploded view of part of FIG. 5.

Referring to FIGS. 5 and 6, a further embodiment of the present invention is shown in which similar parts are identically labelled. The embodiments of FIGS. 1 to 4 all provide an opportunity for the hand of a user to be pinched between the various moving parts of the clamp during adjustment of the clamp or as the clamping force is applied. Usually this pinching action will be between longitudinal members 22 and threaded shaft 12 or mounting block 20. FIGS. 5 and 6 show an embodiment designed to alleviate this pinching problem by providing a shroud member 38 that encloses threaded shaft 12. As best shown in FIG. 5, the shroud is adapted to permit pivoting of the handle member past shaft 12 and prevent objects from becoming caught between the handle and the threaded shaft during pivoting.

Shroud member 38 is preferably in the form of a quarter arcuate section having a hollow interior that encloses threaded shaft 12. The arcuate section is pivotally mounted at its apex 40 to mounting block 20 defined by a pin member. In this particular embodiment, the clamping handle comprises a grip 42 with attached spaced, parallel arms 22 that extend on either side of the arcuate section and terminate in cam members 24. Arms 22 are pivotally mounted to opposite ends of pin mounting block 20 such that the arcuate section of the shroud passes freely between spaced, parallel arms 22 when the clamping handle is pivoted.

Shroud member 38 is able to pivot about mounting block 20 with the handle so that the shroud is effective at any angle of the handle. Co-operating tongue and groove means in the form of grooves 44 on the outer surface of the shroud and tongues 45 on the inner surfaces of arms 22 co-ordinate pivoting of the shroud with respect to the handle. When tongues 45 reach the ends of their respective grooves, shroud 38 is caused to pivot with the handle until the shroud is rotated into contact with the movable clamping member bar 14 whereupon the handle and shroud are free to move independently again.

Referring to FIG. 5, note that the hollow interior of the shroud is sufficiently large to accommodate axial movement of mounting block 20 along threaded shaft 12 so that workpieces of varying size can be fitted between movable clamping member 14 and fixed clamping surface 7.

All embodiments of the present invention can be constructed such that there is a single pivoting handle on the movable clamping member or a plurality of independently operated pivoting handles attached to corresponding threaded shafts that urge against a single movable clamping member to allow for work on particularly large workpieces.

Although the present invention has been described in some detail by way of example for purposes of clarity and understanding, it will be apparent that certain changes and modifications may be practiced within the scope of the appended claims.

I claim:

1. A cam action clamp for use against a fixed clamping surface comprising:
   a threaded shaft extending outwardly from said fixed clamping surface;
   a movable clamping member having a clamping surface and a channel therethrough to allow said member to be mounted on said threaded shaft for slidable movement along said shaft;
   a thrust plate adjacent said movable clamping member adjacent said channel;
   coarse adjustment means comprising a mounting block threadably mounted on said threaded shaft;
   a clamping handle pivotally mounted to said mounting block for movement between a released and a clamped position, said handle being formed with fine adjustment means comprising a cam member that abuts said thrust plate whereby pivoting said handle causes said cam member to engage said thrust plate to slidably advance said movable clamping member along said threaded shaft toward said fixed clamping surface in order to clamp an article between said clamping surfaces, and whereby said mounting block can be rotated along said threaded shaft to vary the distance between said clamping surfaces;
   said thrust plate being formed with means to permit substantially the same clamping force to be exerted at different clamped positions of the clamping handle with respect to said threaded shaft.

2. A cam action clamp as claimed in claim 1 in which said handle comprises a pair of parallel, longitudinal extensions pivotally mounted to opposite sides of said mounting block.

3. A cam action clamp as claimed in claim 1 in which said thrust plate has a circular face to accommodate said cam members of said handle no matter the rotational angle of said mounting block on said threaded shaft.

4. A cam action clamp as claimed in claim 1 in which said cam member is adapted to engage said thrust plate when said clamping handle is pivoted to align essentially parallel to said threaded shaft.

5. A cam action clamp as claimed in claim 1 in which said cam member is adapted to engage said thrust plate when said clamping handle is pivoted to align essentially perpendicular to said threaded shaft.

6. A cam action clamp as claimed in claim 1 in which said means to permit substantially the same clamping force to be exerted comprises a plurality of stepped surfaces formed on the face of said thrust plate for engagement by said cam member whereby said clamping handle can be rotated on said threaded shaft from a first position engaging one of said plurality of stepped surfaces to a second position at a different angle with respect to said threaded shaft, said thrust plate at said second position of said clamping handle being rotated such that said cam member engages a different one of said plurality of stepped surfaces that allows said cam action clamp to exert the same clamping force as when at the first position.

7. A cam action clamp as claimed in claim 6 in which said stepped surfaces are separated by a distance that corresponds to the thread pitch of said threaded stud divided by the number of stepped surfaces.

8. A cam action clamp as claimed in claim 6 in which said clamping handle is formed with paired cam members pivotally mounted to opposite sides of said mounting block and said stepped surfaces are formed in pairs on said thrust plate adapted to be engageable by said paired cam members.

9. A cam action clamp as claimed in claim 8 in which said thrust plate is formed with a central projection adapted to be removably inserted between said paired cam members to releasably connect said thrust plate to said clamping handle.

10. A cam action clamp for use against a fixed clamping surface comprising:
    a threaded shaft extending outwardly from said fixed clamping surface;
    a movable clamping member having a clamping surface and a channel therethrough to allow said member to be mounted on said threaded shaft for slidable movement along said shaft;
    a thrust plate adjacent said movable clamping member adjacent said channel;
    coarse adjustment means comprising a mounting block threadably mounted on said threaded shaft;
    a clamping handle pivotally mounted to said mounting block, said handle being formed with fine adjustment means comprising a cam member that abuts said thrust plate whereby pivoting said handle causes said cam member to engage said thrust plate to slidably advance said movable clamping member along said threaded shaft toward said fixed clamping surface in order to clamp an article between said clamping surfaces, and whereby said mounting block can be rotated along said threaded shaft to vary the distance between said clamping surfaces; and
    a shroud member in the form of an arcuate section enclosing said threaded shaft and adapted to permit pivoting of said handle member past said shaft and prevent objects from becoming caught between said handle and threaded shaft during said pivoting.

11. A cam action clamp as claimed in claim 10 in which said shroud member is formed with a hollow interior that encloses said threaded shaft.

12. A cam action clamp as claimed in claim 10 in which said shroud member is in the form of an arcuate section mounted at its apex to said mounting block, and said clamping handle comprises a grip with attached spaced, parallel arms that extend on either side of said arcuate section and terminate in said cammed members, said arms being pivotally mounted to opposite sides of said mounting block such that said arcuate section passes freely between said spaced, parallel arms when said clamping handle is pivoted.

13. A cam action clamp as claimed in claim 12 in which said shroud member is in the form of an arcuate quarter section pivotally mounted at its apex to said mounting block.

14. A cam action clamp as claimed in claim 13 including co-operating tongue and groove means formed on said spaced, parallel arms and said arcuate section to coordinate pivoting of said arcuate section with respect to said clamping handle.

* * * * *